Feb. 4, 1958 H. L. HOKE 2,822,195
ADJUSTABLE FOLLOWER RING TYPE PIPE CLAMP
Filed Oct. 26, 1951 4 Sheets-Sheet 1

INVENTOR.
HOWARD L. HOKE
BY Robert E. Burns
ATTORNEY

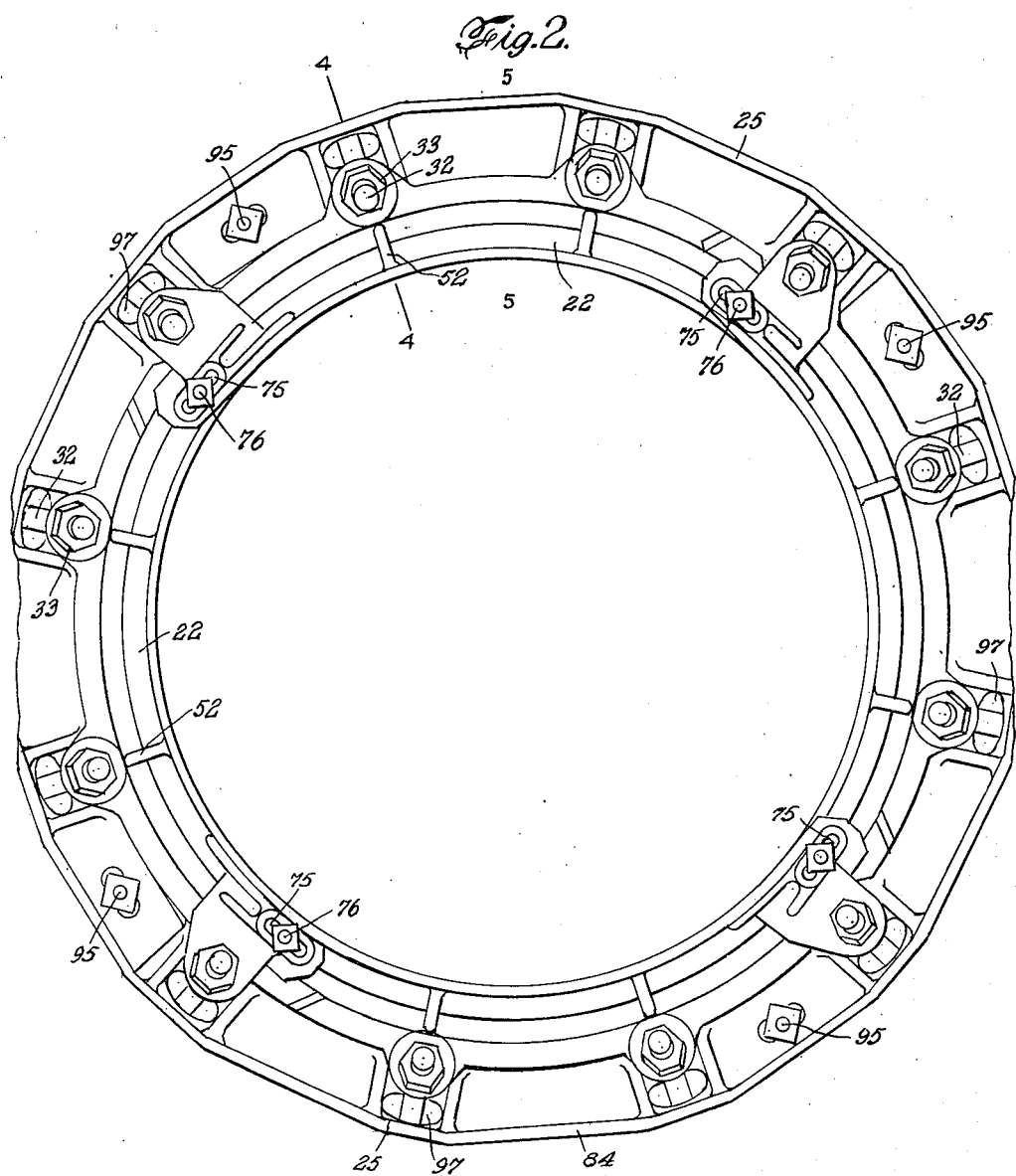

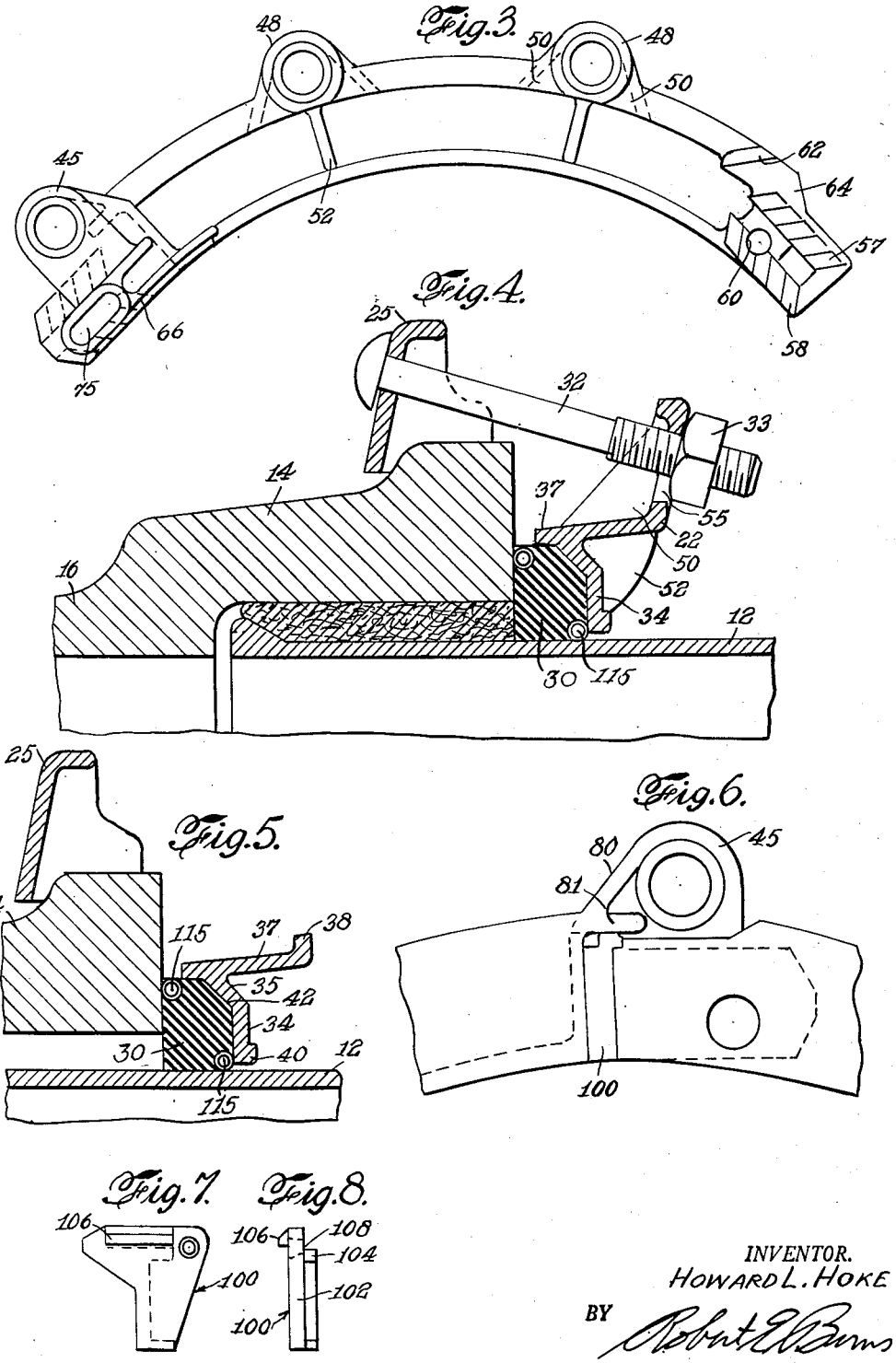

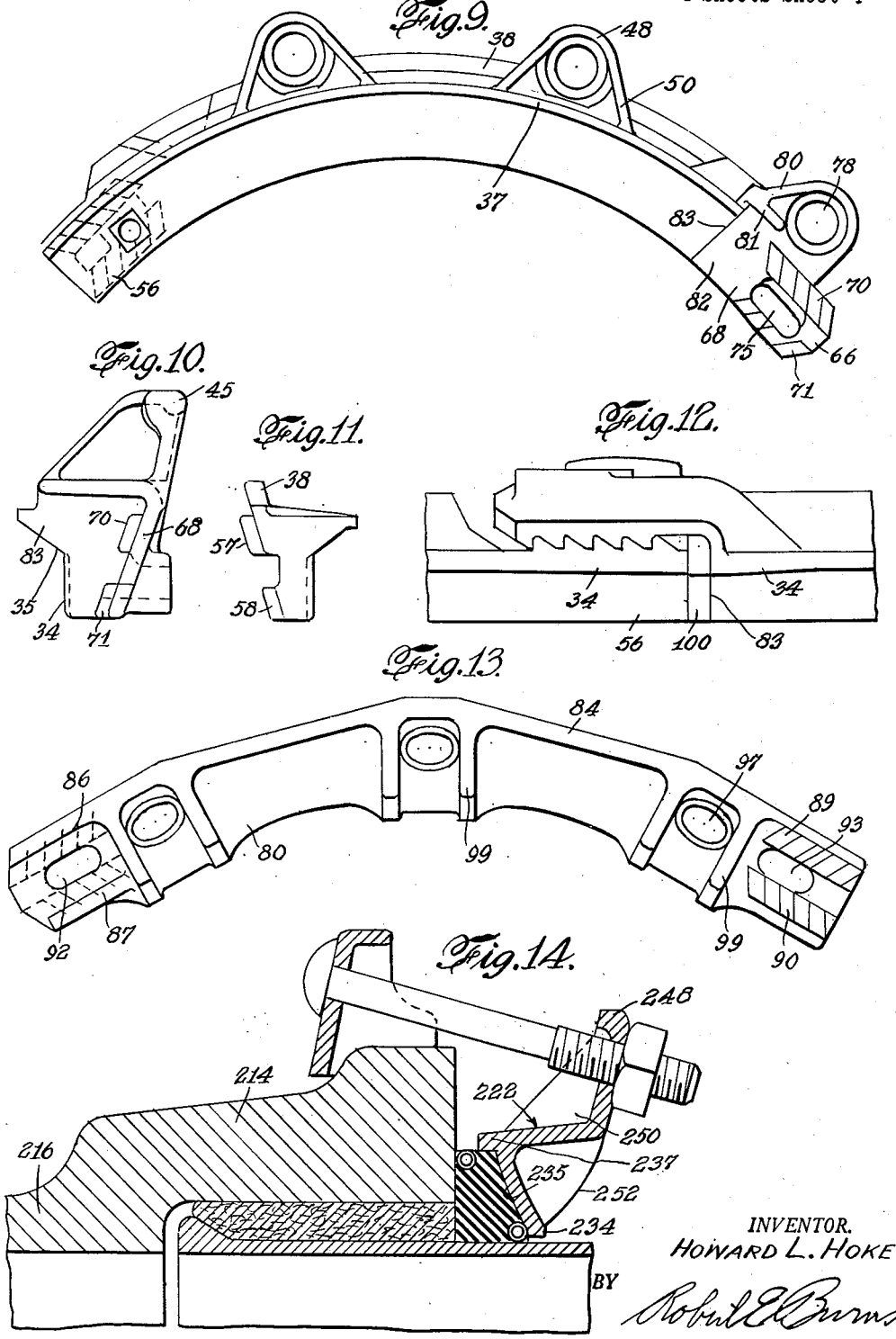

United States Patent Office 2,822,195
Patented Feb. 4, 1958

2,822,195

ADJUSTABLE FOLLOWER RING TYPE PIPE CLAMP

Howard L. Hoke, Bradford, Pa., assignor to Dresser Industries, Inc., a corporation of Delaware Application October 26, 1951, Serial No. 253,235

11 Claims. (Cl. 285—337)

This invention relates to a pipe coupling and is more particularly concerned with an adjustable pipe coupling adapted for use with pipe of the bell and spigot type for applying sealing pressure to a gasket or packing member for the joint between the sections of pipe.

In the installation of pipe lines for the transmission of water and other fluids, it is common practice to use pipe of the so-called bell and spigot type, the spigot end of one section of pipe being received in the bell end of the adjacent section. In connecting the pipe sections in laying the pipe line, a resilient packing or other caulking material is commonly packed between the internal periphery of the bell end and against the outer surface of the spigot end to provide a fluid-tight seal for the joint. In many instances, however, particularly in pipe lines carrying fluids under pressure, such caulking material in itself does not provide a permanent fluid-tight seal and has a tendency to be displaced by the pressure of the fluid flowing through the line. It has therefore become the practice to place a pipe clamp or coupling around the joint, either at the time the pipe sections are joined in laying the pipe line or at some subsequent time when the pipe line is repaired, for example, when a leak occurs due to the displacement of the caulking material. One type of pipe clamp used on this type of pipe line joint comprises an annular gasket member which encircles the spigot end of the pipe section and engages the face of the bell end of the adjacent pipe section, and clamping means for holding the gasket in fluid-tight sealing position. The pipe clamping means commonly employed comprises a follower ring, which presses upon the gasket, an anchor ring which fits over the bell end of the pipe and is constructed to engage the bell to prevent withdrawal over the bell, and a plurality of bolts which extend between the follower ring and the anchor ring and when tightened serve to draw the follower ring toward the anchor ring to compress the gasket into sealing contact with the end face of the bell and the adjacent peripheral surface of the spigot.

Since commercial pipe of any standard size generally varies from what may be termed the nominal external diameter, some pipe being slightly under-sized and some pipe being slightly over-sized, it is desirable for the pipe clamp used for the above mentioned purpose to be adjustable to fit pipe of varying outside diameters, i. e. to accommodate both over-sized and under-sized pipe of the nominal pipe size for which the clamp or coupling was made. Particularly important is the adjustment of the follower ring so that this ring will fit closely around the spigot and avoid an excessive annular space between the inner periphery of the ring and the exterior surface of the spigot through which the gasket material would tend to be extruded upon application of sealing pressure by tightening the bolts to draw the follower ring toward the anchor ring. For this purpose it has been proposed to form the follower ring from a plurality of arcuate sections which are adjustably interconnected to form the complete ring. Suitable adjustment of the follower ring, however, raises numerous practical problems. When the bolts connecting the follower ring with the anchor ring are drawn up they tend to move the follower ring axially of the pipe to apply pressure to the gasket and the gasket tends to resist such movement. Due to the fact that the bolts are positioned radially from the gasket a substantially greater distance from the center of the rings, the pull of the bolts is out of line with resistance of the gasket resulting in forces which tend to twist or "roll" the follower ring. Furthermore, the gasket engaging surface of the follower ring is generally inclined in order to press the gasket against the surface of the spigot as well as against the face of the bell and this gives rise to reaction forces when the bolts are drawn up which act radially outwardly on the ring. Still other forces result from the fact that the gasket pressure is distributed throughout the ring, whereas the bolts which connect the follower ring with the anchor ring are spaced apart to a considerable extent. This arrangement results in still further torque and bending moments acting upon the arcuate sections from which the follower ring is constructed. Distortion of the follower ring by the forces acting upon it tends to produce non-uniform gasket pressures and this is particularly undesirable. It will thus be apparent that the construction of a sectional follower ring comprising arcuate ring segments which are adjustable relative to one another to vary the diameter of the follower ring to accommodate it to the particular exterior diameter of the pipe to which it is applied, and at the same time capable of satisfactorily withstanding the stresses to which the ring is subjected in use, presents numerous and serious difficulties.

The difficulties are further increased by the fact that the follower ring in all of its adjusted sizes must present a smooth and continuous gasket engaging surface. Furthermore, from the standpoint of the manufacturer, it is essential that the clamp be of such construction that it can be easily and economically manufactured with minimum grinding or machining and without complicated casting or coring, which are operations which tend to increase the cost of manufacture. It is also desirable for the clamps to be of relative simple construction with a minimum number of loose parts and yet to be effective in service.

It is the principal object of the present invention to provide a pipe clamp or coupling for bell and spigot pipe of improved construction which is adjustable to several different sizes to fit pipe of different external diameters and which is constructed in such manner that the effects of the various above-mentioned forces are minimized so that the follower ring will avoid excessive strain or objectionable distortion by the forces to which the clamp is subjected in use.

It is another object of the invention to provide, in a pipe coupling of the character indicated, a follower ring which provides an uninterrupted gasket engaging surface and makes possible uniform and higher gasket pressures.

It is a further object of the invention to provide an adjustable pipe clamp of simple construction which can be economically manufactured and easily and quickly installed.

Another object of the invention is to provide an adjustable clamp for bell and spigot pipe which has a minimum of loose parts.

In accordance with the invention there is provided a clamp or coupling for bell and spigot pipe comprising a follower ring adapted to cooperate with an anchor ring by means of bolts to compress a gasket into sealing engagement between the spigot and the bell sections of the pipe being coupled, the follower ring being formed from a series of interengaging arcuate ring sections adapted to be connected in several adjustable positions, and the follower ring and the anchor ring cooperating in such manner that the bolts connecting the two rings are disposed when the clamp is in position upon the pipe at an angle relative to the axis of the pipe up to a maximum angle of about 12°.

It is a feature of the invention that the means connecting the follower ring segments are substantially in radial alignment with the bolt holes in the ring segments for passage of the bolts connecting the follower ring with the anchor ring.

It is another feature of the invention that the circle upon which the bolts lie is brought relatively close to the pipe, thereby substantially reducing the tendency of the follower ring to roll when the bolts are drawn up.

It is a further feature of the invention that the follower ring segments are constructed in such manner that a filler piece for increasing the circumference of the follower ring is readily engageable with the ring segment to prevent displacement during assembly operations.

It is a further feature of the invention that the gasket recess defined by the follower ring permits the use of a deep gasket whereby greater clearance is obtained between the bell face and the leading edge of the follower ring before tightening of the bolts is begun.

Other objects and features of the invention will be readily apparent from the following detailed description of the invention and from the drawings wherein:

Fig. 2 is a sectional view taken approximately along the line 2—2 of Fig. 1 showing the sectional adjustable follower ring of the illustrated clamp in end elevation;

Fig. 3 is a side elevational view of the outside of one of the follower ring segments shown in Fig. 1;

Fig. 4 is a sectional view taken approximately along the line 4—4 of Fig. 2;

Fig. 5 is a similar sectional view taken approximately along the line 5—5 of Fig. 2;

Fig. 6 is a fragmentary elevational view of the connecting ends of two sections of the follower ring showing the use of the filler piece;

Fig. 7 is a side elevational view of the filling piece shown in Fig. 6;

Fig. 8 is an end elevational view of the filler piece;

Fig. 9 is a side elevational view of the inside of the follower ring segment shown in Fig. 3;

Fig. 10 is an end elevational view of the follower ring segment shown in Figs. 3 and 9 as seen from the left in Fig. 3 and from the right in Fig. 9;

Fig. 11 is an end elevational view of the follower ring segment shown in Figs. 3 and 9 as seen from the right in Fig. 3 and from the left in Fig. 9;

Fig. 12 is a fragmentary elevational view of the meeting ends of two adjacent follower ring segments as seen from the axis of the ring;

Fig. 13 is a side elevational view of the inside of one of the segments forming the anchor ring shown in Figs. 1, 4 and 5; and Fig. 14 is a fragmentary axial sectional view of a modified form of follower ring in accordance with the invention defining a gasket recess of modified cross-sectional outline.

Figure 1:
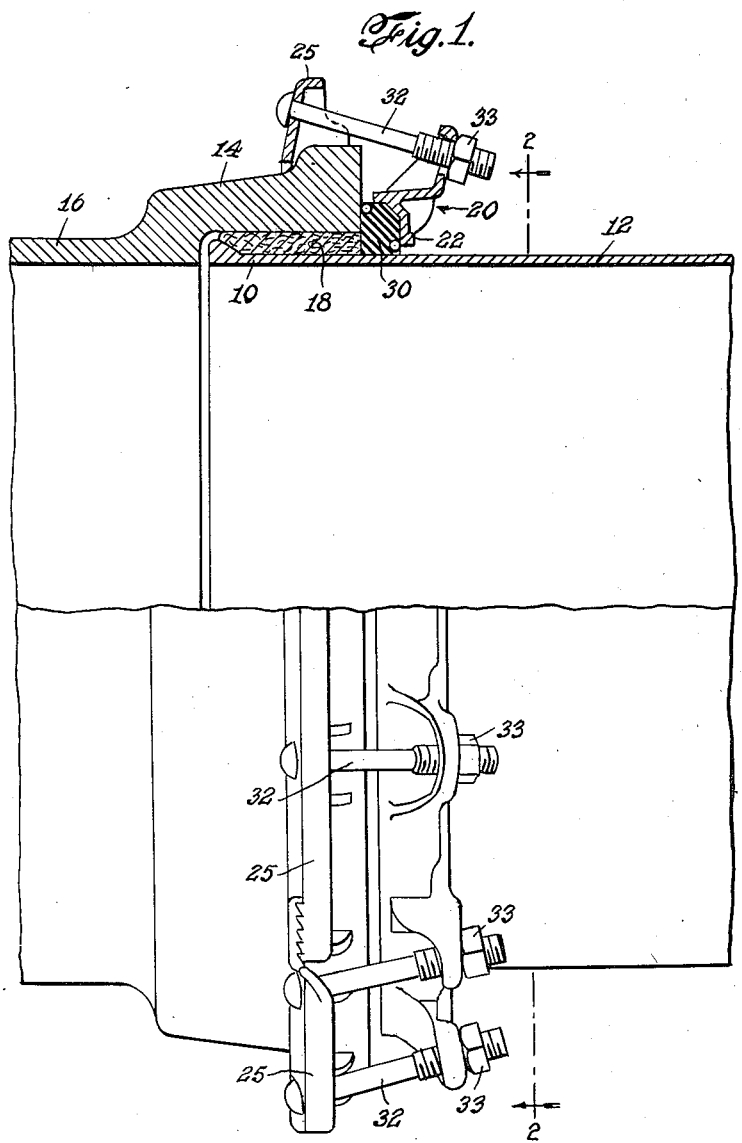
Fig. 1 is a sectional view, partly in elevation, of a pipe line showing bell and spigot pipe sections connected and sealed by a clamp embodying features of the present invention.

Referring to the drawings, and more particularly to Figs. 1 and 2, the numeral 10 designates the spigot end of a pipe section 12 which is received into the bell portion 14 of the adjacent pipe section 16 and the two pipe sections sealed with caulking material 18 packed between the inner surface of the bell 14 and the opposed portion of the spigot end 10. The reference numeral 20 designates generally the follower ring of the clamp illustrated which is formed from a plurality of interengaging arcuate sections 22. Cooperating with the follower ring 20 is an anchor ring 25, the follower ring and the anchor ring being drawn toward one another to compress a gasket 30 into sealing engagement between the pipe sections 12 and 16 by means of bolts 32 provided with nuts 33.

The arcuate sections 22 of the follower ring 20 are adapted to be united with one another in such manner as to provide a ring of adjustable diameter having the strength, ruggedness and durability of a solid ring. To provide the desired adjustability, the ring is preferably made up of at least three sections, but additional sections are advantageously used in clamps for pipes of larger diameter. The follower ring 20 shown in the drawings is formed from four arcuate sections 22 and is suitable for use, for example, with 20 inch pipe. The arcuate sections 22 are advantageously identical in structure so that they can be used interchangeably thereby facilitating manufacture and reducing the number of different parts which need to be kept in stock. As shown in Fig. 5, the body portion of each section 22, as seen in cross-section, comprises a radial inner portion 34, an oblique outer portion 35 and an axial web portion 37 having a reinforcing rib 38 on its peripheral edge. The lower body portion 34 is also conveniently provided with a reinforcing rib 40. As shown, the web 37 has an inner portion extending somewhat beyond the point of juncture with the oblique body portion 35 so that the web 37 and the body portions 34 and 35 define a three-sided gasket recess 42. The inner gasket recess-defining surfaces of the parts 34, 35 and 37 are substantially planar. As shown in Fig. 12, however, the radial inner portion 34 is gradually thickened adjacent each end of the follower ring section 22 to reduce the depth of the gasket recess at these points.

As shown in the embodiment illustrated in Fig. 3, the arcuate follower ring sections 22 are provided with an end bolt lug or ear 45 and two intermediate bolt lugs or ears 48. As will be seen in Fig. 4, the bolt lugs 48 are formed as extensions of the reinforcing rib 38 and are strengthened with two lateral reinforcing ribs 50, and a lower radial reinforcing web 52 of convex arcuate curvature, and are provided with bolt holes 55 for receiving the aforementioned bolts 32. The bolt holes 55 are advantageously of substantially greater diameter than the bolt shanks. It will be observed that the lugs 48 diverge outwardly at an angle with respect to the axis of the arcuate sections 22 so that the bolts 32 passing through the bolt holes 55 will be similarly inclined. This angle may vary up to about 15° from the vertical plane passing through the clamp axis.

As previously mentioned, the arcuate sections are provided with means for adjusting them relative to one another for varying, within the predetermined limits, the circumference of the follower ring which is formed from the arcuate sections. The means provided in accordance with the present invention for adjustably connecting the arcuate sections 22 are shown in Figs. 3 and 9. On the outer face of the end 56 of each arcuate section 22 there are provided a series of obliquely-disposed teeth or shoulders 57 and 58, a bolt hole 60 being formed in the ring section 22 at the point at which the teeth 57 and 58 are provided. The structure of the outer face of the ring is modified slightly at the toothed end in order to prevent the teeth 57, 58 from extending radially outwardly beyond the reinforcing rib 38. Thus, as shown at 62, the rib 38 is cut away to provide a plateau 64 from which the teeth 57 extend.

The other end of the arcuate section 22 is provided with an integral extension 66 having an outwardly sloped inner recessed face 68 (Fig. 10) provided with oblique teeth or shoulders 70, 71 which are complementary in structure to teeth 57, 58 and adapted to mesh therewith. The recessed face 68 is formed by reason of the fact that the inner surface of the extension 66 is offset outwardly from the gasket engaging surfaces 34, 35 and 37. It will be apparent that the teeth 57, 58, 70, 71 permit adjacent ring segments 22 to be overlapped to varying degrees, thus providing for an adjustable ring circumference. While in the embodiment illustrated the teeth 57, 58, 70, 71 are obliquely disposed they may, if desired, be radially disposed. A circumferentially-extending slot 75 is provided in the extension 66 for receiving a bolt 76 for connecting the adjacent ring segments together. As will be seen from the drawings, the previously mentioned bolt lug 45 is formed above the extension 66 and defines a bolt hole 78 which is positioned substantially above the bolt slot 75. The bolt lug 45 is provided with a reinforcing web 80 on the inner face of the segment 22 which terminates at an axial web 81 which defines with the recessed face 68 of the extension 66 a sump 82 having a radial wall 83.

When the arcuate follower ring sections 22 are assembled to form the follower ring 20, the teeth or shoulders 57 and 58 of each section 22 mesh and interlock with the shoulders 70 and 71 on the adjacent section, the degree of interlocking of the respective teeth depending on the precise diameter of the pipe to which the follower ring is applied. Thus, if the pipe diameter is less than the nominal diameter, i. e. if the pipe is undersized, then all of the teeth 57 and 58 will interlock with all of the teeth 70 and 71 and the bolts 76 (Fig. 2) will be positioned at the inner ends of the bolt slots 75, whereas if the pipe is oversized and has a greater external circumference, then only some of the teeth 57 and 58 will mesh with only some of the teeth 70 and 71 and the bolts 76 will be positioned at the outer ends of the bolt slots 75. In either case, however, the bolts 75 will lie substantially on the axial plane passing through the aperture 76 in the ear or lug 45. Sufficient of the teeth 57, 58, 70 and 71 interengage, however, to provide a strong connection and to hold the sections 22 against twisting relative to one another and against separation in a circumferential direction. The inclination of the teeth in opposite directions on opposite sides of the center line of each of the sections 22 holds the sections in proper alignment and prevents relative displacement in a direction radially of the pipe line.

As previously mentioned, the follower ring 20 formed by the arcuate sections 22 cooperates with an anchor ring 25 by means of bolts 32 to compress a gasket 30 into sealing relationship between the adjacent pipe sections at the juncture of which the clamp of the invention is mounted. The anchor ring 25 is, like follower ring 20, formed from several arcuate sections 80, generally equal in number to the number of sections 22. As shown in Figs. 1, 4 and 13, each anchor ring section 80 comprises an arcuate body portion 82 and a peripheral, inwardly-directed reinforcing rib or flange 84. One end of the section 80 has obliquely-disposed teeth or shoulders 86, 87 on its outer surface, and the opposite end of the arcuate section has complementary obliquely-disposed teeth or shoulders 89, 90. Bolt slots 92 and 93 are provided in the section ends between the teeth 86, 87 and the teeth 89, 90, respectively. The rib 84 is cut away at the end carrying the teeth 89, 90 to permit overlapping of the sections 80 and interengagement of the respective teeth in a uniform manner. The sections 80 are connected together to form the anchor ring 25 by means of bolts 95 which pass through bolt slots 92 and 93, the teeth 86, 87, 89 and 90 being interengaged to provide a ring of the desired circumference, as above-described in connection with follower ring 20, to fit the bells of both undersize and oversize pipe of the nominal pipe size for which the clamp is designed. Spaced along each section 80 are elliptical bolt apertures 97 adapted to receive the bolts 32, and adjacent each of the apertures 97 are two projections 99 which are adapted to engage the outer surface of the bell portion 14, as shown in Figs. 1 and 4. The lower surfaces of the projections 99 are inclined with respect to the axis of the anchor ring in order to permit the bolts 32 to be inwardly inclined in passing from the anchor ring to the follower ring, as shown in the drawings. The anchor ring 25 is assembled by interconnecting the sections 80 by means of the bolts 95. The spacing of the bolt apertures 97 is such that when they are aligned with the bolt apertures 55 and 78 the meeting edges of the anchor ring sections 80 will be offset with respect to the meeting edges of the follower ring sections 22.

When the clamp defined by the follower ring 20 and the anchor ring 25 is applied to undersize pipe, the sections 22 of the follower ring are in abutting relationship with respect to adjacent parts. When, however, oversize pipe is encountered, there will be a gap between the end 56 of each of the sections 22 and the adjoining radial wall 83 of the sump 82 formed in the projection 66 of the adjacent section. To fill this gap, and thus to insure uniform pressure upon the gasket 30, there is provided in accordance with the invention, a filler piece which has a gasket-engaging surface corresponding to the surface defined by web 37 and the body portions 34 and 35 of the follower section 22. As shown in Figs. 7 and 8, the filler piece 100 has a main body portion 102 with a spacing web 104 provided along one side and a flange or web portion 106 extending outwardly from the upper edge of the body portion 102 opposite the web 104. It will be seen that the spacing web 104 terminates at a point short of the upper edge of the body portion 102 to define a recess 108. When two of the sections 22 are interengaged, as shown in Fig. 12, the space between the end 56 and the radial wall 83 is filled by the filler piece 100, seated in the sump 82, and having its flange portion 106 extending over the extremity of the end 56 to hold the filler in place in the sump. It will be apparent that as the circumference of the follower ring 20 is increased by adjustment of the extent of the overlapping of the sections 22, the space between the end 56 of one section and the radial wall 83 of the adjacent section will increase. In this case, additional filler pieces are inserted. The construction of each filler piece 100 is such that the rib 106 of one filler piece will be received in the recess 108 of the adjoining filler pieces so that these units will be held in place during installation. The thickness of each filler piece 100 is selected to be substantially equal to the circumferential distance between the centers of the teeth or shoulders 57, 58, 70 and 71, all of which are equally spaced circumferentially. Thus, as each of the sections 22 is moved over the distance of one tooth in increasing the circumference of the follower ring, a space for one additional filler piece 100 is created between the edge of end 56 and radial wall 83. It will thus be seen that the insertion of the filler pieces is a simple matter and serves to provide a substantially continuous gasket-engaging surface regardless of the relative circumferential positions of the follower ring sections which are readily adjustable to provide a follower ring having a circumference which is variable over a wide range to fit pipe of all ranges of sizes encountered in practice.

The follower ring 20 and the anchor ring 25 cooperate, when drawn toward one another by means of the bolts 32 to compress the gasket 30 into sealing engagement with the pipe surfaces. The gasket 30 is annular in form and is formed from rubber or rubber composition, this term being used generically to include natural and synthetic rubbers and elastomeric compounds or compounds having like properties and characteristics. The material forming the gasket 30 is relatively firm and solid and sufficiently resilient and elastic to flow under pressure to conform to the surfaces between which it is confined. While the gasket member 30 may be in the form of a continuous annulus, it is also advantageously split at one point and provided at the split with overlapping or abutting ends. The gasket 30 may also be of varying cross-sectional outline although it is preferably in the form shown in the drawings with its outer surface conforming to the outline of the gasket recess 42. When the follower ring 20 is drawn toward the bell end 14 of the pipe section 16 to compress the gasket 30, the gasket may tend to be extruded out from the gasket recess around the edges of the follower ring. To insure against such extrusion, there are advantageously provided expansible metallic rings 115 at the upper forward edge and at the lower rearward edge of the gasket. The expansible rings 115 are preferably combined with the gasket 30 in a singular unitary structure and are advantageously in the form of an annular armor helix which is molded into the rubber composition of the gasket by known molding means. The rings 115 are preferably imbedded in the gasket so as to be substantially flush with the outer surface of the gasket. When the gasket is compressed, the expansible rings 115 are forced between the pipe surfaces and the adjacent edges of the follower ring 20 and thus effectively close these gaps to prevent extrusion of the rubbery material of the gasket. Meanwhile, the gasket 30 is compressed axially to effect a fluid-tight flexible sealing of the two pipe sections.

The method of installing the clamp of the invention will be obvious from the drawings. Caulking material 18 is inserted between the cooperating portions of the pipe sections 12 and 16. The gasket 30 is then placed in position adjacent the bell end 14 and the follower ring 20 is assembled around the pipe section 12 in position to compress the gasket 30. The anchor ring 25 is assembled around the bell portion 14 and the bolts 32, suitably positioned in the opposed apertures in the two rings, are drawn up by means of the nuts 33 to urge the follower ring 25 axially toward the bell portion 14 to compress the gasket 30 axially and thereby to expand it radially into sealing engagement with the adjoining pipe sections.

The above-described features of the bell and spigot pipe clamp of the invention combine to define a clamp having improved characteristics and strength and adapted to provide a fluid-tight joint of increased efficiency and effectiveness. The angular positioning of the bolts brings the forces acting on the follower ring closer to the pipe and the tendency of the follower to roll when it is drawn toward the anchor ring is greatly reduced in comparison with constructions in which the bolts are substantially parallel to the axis of the pipe line. The positioning of the juncture between the sections of the follower ring substantially on the radius on which one of the bolt lugs lies insures a follower ring of uniform strength and avoids weakening of the ring at the ring section junctures. The reinforcing web or gusset 52 below each of the bolt lugs in the follower ring sections is of such construction that maximum fibre stress is situated inwardly of the outer surface of the arc defined by the web or gusset 52 during conditions when the outer portion of this gusset is under tension. The reinforced web 38 has a substantially arcuate transverse cross section which effectively resists straightening between bolt lugs. As previously mentioned, the radial inner portion 34 which defines one wall of gasket recess 42 is gradually thickened adjacent each end of each follower ring section 22 to reduce the depth of the gasket recess. When the bolts 32 are drawn up to move the follower ring toward the anchor ring, the reduced depth of the gasket recess 42 at its ends prevents areas of low gasket pressure and insures adequate pressure on all parts of the gasket.

The gasket recess defined by the follower ring sections in the preferred embodiment of the invention is formed by the intersection of three planes defined by the portions 34, 35 and 37 which permits the use of a deep gasket whereby a substantial clearance is obtained between the face of the bell end and the leading edge of the follower ring before tightening of the bolts is begun. As the bolts are tightened to compress the gasket, the portion of the gasket recess defined by the forward end of the axial web portion 37 permits a small amount of radial expansion of the gasket and the leading edge of the follower ring engages the expansible metal ring 115 in the gasket and thus prevents its escape through the annular clearance between the leading edge of the follower ring and the adjacent bell pipe end. The clamp of the invention is, however, not confined to the specific gasket recess outline shown in the above described embodiment. Thus, as shown in Fig. 14, wherein parts corresponding to those shown in Figs. 4 and 5 have been given like reference numerals to which 200 has been added, the follower ring section 222 has a radial inner portion 234, an arcuate outer portion 235 and an axial web portion 237. The bolt lug 248 extends from the peripheral edge of the web portion 237 and is reinforced by lateral reinforcing ribs 250 and an arcuate web 252. It will be observed that the arcuate outer portion 235 has a convex gasket-engaging face. In this construction, when the follower is urged toward the bell 214 the initial concentration of gasket pressure is obtained in the corner formed by the bell face of the pipe 216. The leading edge of the follower ring, as in the embodiment of Fig. 4, engages the expansible metal ring in the gasket and prevents its escape.

It will be obvious that various other changes and modifications may be made in the embodiments above described and illustrated in the accompanying drawings without departing from the scope of the invention as defined in the appended claims and it is intended, therefore, that all matter contained in the foregoing description and in the drawings shall be interpreted as illustrative only and not in a limiting sense.

What I claim and desire to secure by Letters Patent is:

1. A pipe clamp for applying sealing pressure to a gasket for a bell and spigot pipe joint, comprising an anchor ring having a plurality of peripherally-spaced bolt apertures, a follower ring formed from a plurality of interconnected arcuate sections and having a plurality of radially-extending circumferentially-spaced integral bolt lugs corresponding in number to said bolt apertures, and a plurality of bolts extending through said lugs and said apertures to connect the follower ring and the anchor ring, said bolt lugs diverging outwardly away from said anchor ring at an angle with respect to the axis of the follower ring and lying radially inwardly of the circle defined by the apertures in said anchor ring, whereby said bolts converge in passing from said anchor ring to said follower ring, the ends of said follower ring sections having a series of circumferentially-spaced teeth for adjustable inter-engagement with the teeth on the adjacent follower ring sections when the sections are joined in overlapping relationship, said bolt lugs being asymmetrically disposed on the follower ring sections with one of said bolt lugs being disposed radially outwardly of the teeth substantially at one end of each follower ring section and the lug nearest the other end of each follower ring section being spaced substantially from said other end and being spaced from the nearest lug of the adjacent follower ring section substantially the distance between adjacent lugs of each section, and means for connecting said follower ring sections, said connecting means being disposed substantially on the radius passing through said bolt lug adjacent said teeth of each follower ring section, the inner face of said follower ring sections defining a gasket recess for confining the outer surface of the gasket when the gasket is compressed into sealing relationship by axial movement of said follower ring toward said anchor ring.

2. A pipe clamp for applying sealing pressure to a gasket for a bell and spigot pipe joint comprising an anchor ring having a plurality of peripherally-spaced bolt apertures, a follower ring formed from a plurality of interconnected arcuate sections and having a plurality of radially-extending circumferentially-spaced integral bolt lugs corresponding in number to said bolt apertures, and a plurality of bolts extending through said lugs and said apertures to connect the follower ring and the anchor ring, said bolt lugs diverging outwardly away from said anchor ring at an angle up to about 12° with respect to the axis of the follower ring and lying radially inwardly of the circle defined by the apertures in said anchor ring, whereby said bolts converge in passing from said anchor ring to said follower ring, the ends of said follower ring sections having a series of circumferentially-spaced teeth for adjustable interengagement with the teeth on the adjacent follower ring section when the sections are joined in overlapping relationship, said bolt lugs being asymmetrically disposed on the follower ring sections with one of said bolt lugs being disposed radially outwardly of the teeth substantially at one end of each follower ring section and the lug nearest the other end of each follower ring section being spaced substantially from said other end and being spaced from the nearest lug of the adjacent follower ring section substantially the distance between adjacent lugs of each section, and means for connecting said follower ring sections, said connecting means being disposed substantially on the radius passing through said bolt lug adjacent said teeth of each follower ring section, the inner face of said follower ring sections defining a gasket recess for confining the outer surface of the gasket when the gasket is compressed into sealing relationship by axial movement of said follower ring toward said anchor ring.

3. A pipe clamp for applying sealing pressure to a gasket for a bell and spigot pipe joint comprising an anchor ring having a plurality of peripherally-spaced bolt apertures, a follower ring formed from a plurality of interconnected arcuate sections and having a plurality of radially-extending circumferentially-spaced integral bolt lugs corresponding in number to said bolt apertures, and a plurality of bolts extending through said lugs and said apertures to connect the follower ring and the anchor ring, said bolt lugs diverging outwardly away from said anchor ring at an angle with respect to the axis of the follower ring and lying radially inwardly of the circle defined by the apertures in said anchor ring, whereby said bolts converge in passing from said anchor ring to said follower ring, the ends of said follower ring sections having a series of circumferentially-spaced teeth for adjustable interengagement with the teeth on the adjacent follower ring section when the sections are joined in overlapping relationship, said bolt lugs being asymmetrically disposed on the follower ring sections with one of said bolt lugs being disposed radially outwardly of the teeth substantially at one end of each follower ring section and the lug nearest the other end of each follower ring section being spaced substantially from said other end and being spaced from the nearest lug of the adjacent follower ring section substantially the distance between adjacent lugs of each section, and means for connecting said follower ring sections, said connecting means being disposed substantially on the radius passing through said bolt lug adjacent said teeth of each follower ring section, the inner face of said follower ring sections defining a gasket recess for confining the outer surface of the gasket when the gasket is compressed into sealing relationship by axial movement of said follower ring toward said anchor ring, said gasket recess having an axial surface, a radial surface, and an oblique connecting surface and said gasket having surfaces conforming substantially to said gasket recess surfaces.

4. A pipe clamp for applying sealing pressure to a gasket for a bell and spigot pipe joint comprising an anchor ring having a plurality of peripherally-spaced bolt apertures, a follower ring formed from a plurality of interconnected arcuate sections and having a plurality of radially-extending circumferentially-spaced integral bolt lugs corresponding in number to said bolt apertures, and a plurality of bolts extending through said lugs and said apertures to connect the follower ring and the anchor ring, said bolt lugs diverging outwardly away from said anchor ring at an angle with respect to the axis of the follower ring and lying radially inwardly of the circle defined by the apertures in said anchor ring, whereby said bolts converge in passing from said anchor ring to said follower ring, the ends of said follower ring sections having a series of circumferentially-spaced teeth for adjustable interengagement with the teeth on the adjacent follower ring section when the sections are joined in overlapping relationship, said bolt lugs being asymmetrically disposed on the follower ring sections with one of said bolt lugs being disposed radially outwardly of the teeth substantially at one end of each follower ring section and the lug nearest the other end of each follower ring section being spaced substantially from said other end and being spaced from the nearest lug of the adjacent follower ring section substantially the distance between adjacent lugs of each section, and means for connecting said follower ring sections, said connecting means being disposed substantially on the radius passing through said bolt lug adjacent said teeth of each follower ring section, the inner face of said follower ring sections defining a gasket recess for confining the outer surface of the gasket when the gasket is compressed into sealing relationship by axial movement of said follower ring toward said anchor ring, and a filler member disposed between opposed surfaces of adjoining follower ring sections to provide a continuous gasket engaging surface, the face of said filler member having a cross-sectional outline corresponding to the cross-sectional outline of said gasket recess and having means for retaining said member in position by engagement with one of said adjoining follower ring sections.

5. A pipe clamp for applying sealing pressure to a gasket for a bell and spigot pipe joint comprising an anchor ring having a plurality of peripherally-spaced bolt apertures, a follower ring formed from a plurality of interconnected arcuate sections and having a plurality of radially-extending circumferentially-spaced integral bolt lugs corresponding in number to said bolt apertures, and a plurality of bolts extending through said lugs and said apertures to connect the follower ring and the anchor ring, said bolt lugs diverging outwardly away from said anchor ring at an angle with respect to the axis of the follower ring and lying radially inwardly of the circle defined by the apertures in said anchor ring, whereby said bolts converge in passing from said anchor ring to said follower ring, the ends of said follower ring sections having a series of circumferentially-spaced teeth for adjustable interengagement with the teeth on the adjacent follower ring section when the sections are joined in overlapping relationship, said bolt lugs being asymmetrically disposed on the follower ring sections with one of said bolt lugs being disposed radially outwardly of the teeth substantially at one end of each follower ring section and the lug nearest the other end of each follower ring section being spaced substantially from said other end and being spaced from the nearest lug of the adjacent follower ring section substantially the distance between adjacent lugs of each section, and means for connecting said follower ring sections, said connecting means being disposed substantially on the radius passing through said bolt lug adjacent said teeth of each follower ring section, the inner face of said follower ring sections defining a gasket recess for confining the outer surface of the gasket when the gasket is compressed into sealing relationship by axial movement of said follower ring toward said anchor ring, said gasket recess having an axial surface, a radial surface, and an oblique connecting surface and said gasket having surfaces conforming substantially to said gasket recess surfaces, and a filler member disposed between opposed surfaces of adjoining follower ring sections to provide a continuous gasket engaging surface, the face of said filler member having a cross-sectional outline corresponding to the cross-sectional outline of said gasket recess and having means for retaining said member in position by engagement with one of said adjoining follower ring sections.

6. A pipe clamp for applying sealing pressure to a gasket for a bell and spigot pipe joint comprising an anchor ring having a plurality of peripherally-spaced bolt apertures, a follower ring formed from a plurality of interconnected arcuate sections and having a plurality of radially-extending circumferentially-spaced integral bolt lugs corresponding in number to said bolt apertures, and a plurality of bolts extending through said lugs and said apertures to connect the follower ring and the anchor ring, said bolt lugs diverging outwardly away from said anchor ring at an angle with respect to the axis of the follower ring and lying radially inwardly of the circle defined by the apertures in said anchor ring, whereby said bolts converge in passing from said anchor ring to said follower ring, the ends of said follower ring sections having a series of circumferentially-spaced teeth for adjustable interengagement with the teeth on the adjacent follower ring section when the sections are joined in overlapping relationship, said bolt lugs being asymmetrically disposed on the follower ring sections with one of said bolt lugs being disposed radially outwardly of the teeth substantially at one end of each follower ring section and the lug nearest the other end of each follower ring section being spaced substantially from said other end and being spaced from the nearest lug of the adjacent follower ring section substantially the distance between adjacent lugs of each section, and means for connecting said follower ring sections, said connecting means being disposed substantially on the radius passing through said bolt lug adjacent said teeth of each follower ring section, the inner face of said follower ring sections defining a gasket recess for confining the outer surface of the gasket when the gasket is compressed into sealing relationship by axial movement of said follower ring toward said anchor ring, the gasket recess having a lesser axial depth adjacent its ends.

7. A pipe clamp for applying sealing pressure to a gasket for a bell and spigot pipe joint, comprising an anchor ring having a plurality of peripherally-spaced bolt apertures, a follower ring formed from a plurality of interconnected arcuate sections and having a plurality of radially-extending circumferentially-spaced integral bolt lugs corresponding in number to said bolt apertures, and a plurality of bolts extending through said lugs and said apertures to connect the follower ring and the anchor ring, said bolt lugs diverging outwardly away from said anchor ring at an angle with respect to the axis of the follower ring and lying radially inwardly of the circle defined by the apertures in said anchor ring, whereby said bolts converge in passing from said anchor ring to said follower ring, the ends of said follower ring sections having a series of circumferentially-spaced teeth for adjustable interengagement with the teeth on the adjacent follower ring section when the sections are joined in overlapping relationship, said bolt lugs being asymmetrically disposed on the follower ring sections with one of said bolt lugs being disposed radially outwardly of the teeth substantially at one end of each follower ring section and the lug nearest the other end of each follower ring section being spaced substantially from said other end and being spaced from the nearest lug of the adjacent follower ring section substantially the distance between adjacent lugs of each section, and means for connecting said follower ring sections, said connecting means being disposed substantially on the radius passing through said bolt lug adjacent said teeth of each follower ring section, the inner face of said follower ring sections defining a gasket recess for confining the outer surface of the gasket when the gasket is compressed into sealing relationship by axial movement of said follower ring toward said anchor ring, one end of each arcuate section having a sump spaced inwardly of said gasket recess, and a filler member disposed in said sump between opposed surfaces of adjoining follower ring sections to provide a continuous gasket engaging surface, the face of said filler member having a cross-sectional outline corresponding to the cross-sectional outline of said gasket recess and having means for retaining said member in position by engagement with one of said adjoining follower ring sections.

8. In a pipe line comprising end abutting bell and spigot pipe sections, a gasket seated around the spigot end of one of said sections and engaging the bell end of the adjacent section and a clamp for applying sealing pressure to said gasket comprising an anchor ring having a plurality of peripherally-spaced bolt apertures, a follower ring formed from a plurality of interconnected arcuate sections and having a plurality of radially-extending circumferentially-spaced integral bolt lugs corresponding in number to said bolt apertures, and a plurality of bolts extending through said lugs and said apertures to connect the follower ring and the anchor ring, said bolt lugs diverging outwardly away from said anchor ring at an angle with respect to the axis of the follower ring and lying radially inwardly of the circle defined by the apertures in said anchor ring, whereby said bolts converge in passing from said anchor ring to said follower ring, the ends of said follower ring sections having a series of circumferentially-spaced teeth for adjustable interengagement with the teeth on the adjacent follower ring sections when the sections are joined in overlapping relationship, said bolt lugs being asymmetrically disposed on the follower ring sections with one of said bolt lugs being disposed radially outwardly of the teeth substantially at one end of each follower ring section and the lug nearest the other end of each follower ring section being spaced substantially from said other end and being spaced from the nearest lug of the adjacent follower ring section substantially the distance between adjacent lugs of each section, and means for connecting said follower ring sections, said connecting means being disposed substantially on the radius passing through said bolt lug adjacent said teeth of each follower ring section, the inner face of said follower ring sections defining a gasket recess for confining the outer surface of the gasket when the gasket is compressed into sealing relationship by axial movement of said follower ring toward said anchor ring, said gasket recess being of lesser axial width and of lesser radial width than the corresponding portions of said gasket and said gasket being provided with expansible metal rings at a radially outer edge and at an axially outer edge to prevent extrusion of the gasket upon compression thereof.

9. In a pipe line comprising end abutting bell and spigot pipe sections, a gasket seated around the spigot end of one of said sections and engaging the bell end of the adjacent section and a clamp for applying sealing pressure to said gasket comprising an anchor ring having a plurality of peripherally-spaced bolt apertures, a follower ring formed from a plurality of interconnected arcuate sections and having a plurality of radially-extending circumferentially-spaced integral bolt lugs corresponding in number to said bolt apertures, and a plurality of bolts extending through said lugs and said apertures to connect the follower ring and the anchor ring, said bolt lugs diverging outwardly away from said anchor ring at an angle with respect to the axis of the follower ring and lying radially inwardly of the circle defined by the apertures in said anchor ring, whereby said bolts converge in passing from said anchor ring to said follower ring, the ends of said follower ring sections having a series of circumferentially-spaced teeth for adjustable interengagement with the teeth on the adjacent follower ring section when the sections are joined in overlapping relationship, said bolt lugs being asymmetrically disposed on the follower ring sections with one of said bolt lugs being disposed radially outwardly of the teeth substantially at one end of each follower ring section and the lug nearest the other end of each follower ring section being spaced substantially from said other end and being spaced from the nearest lug of the adjacent follower ring section substantially the distance between adjacent lugs of each section, and means for connecting said follower ring sections, said connecting means being disposed substantially on the radius passing through said bolt lug adjacent said teeth of each follower ring section, the inner face of said follower ring sections defining a gasket recess for confining the outer surface of the gasket when the gasket is compressed into sealing relationship by axial movement of said follower ring toward said anchor ring, said gasket recess having an axial surface, a radial surface, and an oblique connecting surface and said gasket having surfaces conforming substantially to said gasket recess surfaces, said gasket recess being of lesser axial width and of lesser radial width than the corresponding portions of said gasket and said gasket being provided with expansible metal rings at a radially outer edge and at an axially outer edge to prevent extrusion of the gasket upon compression thereof.

10. In a pipe line comprising end abutting bell and spigot pipe sections, a gasket seated around the spigot end of one of said sections and engaging the bell end of the adjacent section and a clamp for applying sealing pressure to said gasket comprising an anchor ring having a plurality of peripherally-spaced bolt apertures, a follower ring formed from a plurality of interconnected arcuate sections and having a plurality of radially-extending circumferentially-spaced integral bolt lugs corresponding in number to said bolt apertures, and a plurality of bolts extending through said lugs and said apertures to connect the follower ring and the anchor ring, said bolt lugs diverging outwardly away from said anchor ring at an angle with respect to the axis of the follower ring and lying radially-inwardly of the circle defined by the apertures in said anchor ring, whereby said bolts converge in passing from said anchor ring to said follower ring, the ends of said follower ring sections having a series of circumferentially-spaced teeth for adjustable interengagement with the teeth on the adjacent follower ring section when the sections are joined in overlapping relationship, said bolt lugs being asymmetrically disposed on the follower ring sections with one of said bolt lugs being disposed radially outwardly of the teeth substantially at one end of each follower ring section and the lug nearest the other end of each follower ring section being spaced substantially from said other end and being spaced from the nearest lug of the adjacent follower ring section substantially the distance between adjacent lugs of each section, and means for connecting said follower ring sections, said connecting means being disposed substantially on the radius passing through said bolt lug adjacent said teeth of each follower ring section, the inner face of said follower ring sections defining a gasket recess for confining the outer surface of the gasket when the gasket is compressed into sealing relationship by axial movement of said follower ring toward said anchor ring, and a filler member disposed between opposed surfaces of adjoining follower ring sections to provide a continuous gasket engaging surface, the face of said filler member having a cross-sectional outline corresponding to the cross-sectional outline of said gasket recess and having means for retaining said member in position by engagement with one of said adjoining follower ring sections, said gasket recess being of lesser axial width and of lesser radial width than the corresponding portions of said gasket and said gasket being provided with expansible metal rings at a radially outer edge and at an axially outer edge to prevent extrusion of the gasket upon compression thereof.

11. In a pipe line comprising end abutting bell and spigot pipe sections, a gasket seated around the spigot end of one of said sections and engaging the bell end of the adjacent section and a clamp for applying sealing pressure to said gasket comprising an anchor ring having a plurality of peripherally-spaced bolt apertures, a follower ring formed from a plurality of interconnected arcuate sections and having a plurality of radially-extending circumferentially-spaced integral bolt lugs corresponding in number to said bolt apertures, and a plurality of bolts extending through said lugs and said apertures to connect the follower ring and the anchor ring, said bolt lugs diverging outwardly away from said anchor ring at an angle with respect to the axis of the follower ring and lying radially inwardly of the circle defined by the apertures in said anchor ring, whereby said bolts converge in passing from said anchor ring to said follower ring, the ends of said follower ring sections having a series of circumferentially-spaced teeth for adjustable interengagement with the teeth on the adjacent follower ring sections when the sections are joined in overlapping relationship, said bolt lugs being asymmetrically disposed on the follower ring sections with one of said bolt lugs being disposed radially outwardly of the teeth substantially at one end of each follower ring section and the lug nearest the other end of each follower ring section being spaced substantially from said other end and being spaced from the nearest lug of the adjacent follower ring section substantially the distance between adjacent lugs of each section, and means for connecting said follower ring sections, said connecting means being disposed substantially on the radius passing through said bolt lug adjacent said teeth of each follower ring section, the inner face of said follower ring sections defining a gasket recess for confining the outer surface of the gasket when the gasket is compressed into sealing relationship by axial movement of said follower ring toward said anchor ring, one end of each arcuate section having a sump spaced inwardly of said gasket recess, and a filler member disposed in said sump between opposed surfaces of adjoining follower ring sections to provide a continuous gasket engaging surface, the face of said filler member having a cross-sectional outline corresponding to the cross-sectional outline of said gasket recess and having means for retaining said member in position by engagement with one of said adjoining follower ring sections, said gasket recess being of lesser axial width and of lesser radial width than the corresponding portions of said gasket and said gasket being provided with expansible metal rings at a radially outer edge and at an axially outer edge to prevent extrusion of the gasket upon compression thereof.

References Cited in the file of this patent

UNITED STATES PATENTS

| Number | Name | Date |
| --- | --- | --- |
| 980,671 | Price | Jan. 3, 1911 |
| 1,909,297 | Merrill | May 16, 1933 |
| 1,916,968 | Davis | July 4, 1933 |
| 2,031,499 | Norton | Feb. 18, 1936 |
| 2,415,753 | Newell | Feb. 11, 1947 |